United States Patent [19]

Quilliou

[11] 4,440,073
[45] Apr. 3, 1984

[54] PRESSING PLATE FOR USE IN CHEESE MAKING

[75] Inventor: Guy Quilliou, Niort, France

[73] Assignee: Pierre Guerin S.A., Mauze-Sur-Le-Mignon, France

[21] Appl. No.: 335,762

[22] Filed: Dec. 30, 1981

[30] Foreign Application Priority Data

Jan. 15, 1981 [FR] France .................................. 81 00610

[51] Int. Cl.$^3$ ...................... A01J 25/10; A01J 25/12; A01J 25/13; A23C 19/00
[52] U.S. Cl. ........................................ 99/458; 99/460; 99/465; 100/110; 100/116; 425/84; 425/412; 426/414; 426/491
[58] Field of Search .......................... 99/452, 456–459, 99/460, 465, 353, 355, 495, 496; 426/36, 478, 491, 414, 512, 582, 397; 100/110, 113, 116, 242, 182, 184; 425/84, 85, 80.1, 416, 419, 412; 210/513–515; 53/438, 122, 527, 436; 134/88, 94, 109, 110, 201

[56] References Cited

U.S. PATENT DOCUMENTS

| 913,889 | 3/1909 | Hershiser | 100/116 |
| 2,109,559 | 3/1938 | Wickert, Jr. | 100/116 X |
| 2,942,983 | 6/1960 | Sadler et al. | 99/460 X |
| 3,137,228 | 6/1964 | Elow | 100/116 |
| 3,207,064 | 9/1965 | Hauser-Bucher | 100/116 |
| 3,838,955 | 10/1974 | Dubbeld | 425/84 |
| 4,263,330 | 4/1981 | Streeter et al. | 99/456 X |
| 4,289,793 | 9/1981 | Gustafson et al. | 99/458 X |

*Primary Examiner*—Timothy F. Simone
*Attorney, Agent, or Firm*—Kurt Kelman

[57] ABSTRACT

To reduce manual handling of a pressing plate in a cheese-making vat and to facilitate its operation and maintenance, the plate is constituted by a case whose inner surface is covered by a series of rigid filtering panels. These panels are pivotal between an operating position and an open position which permits washing the panels.

10 Claims, 6 Drawing Figures

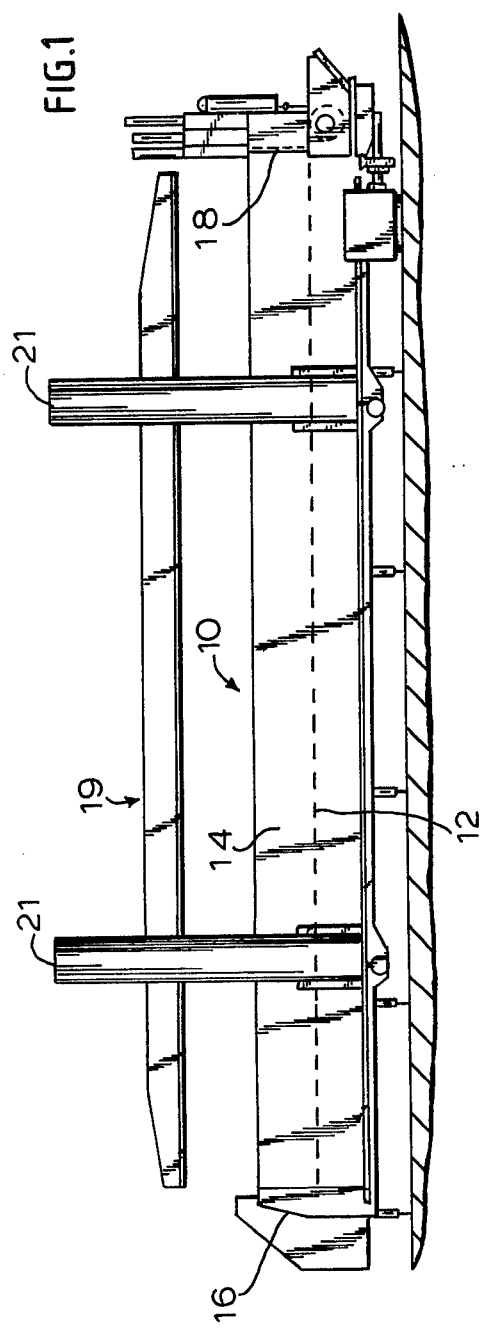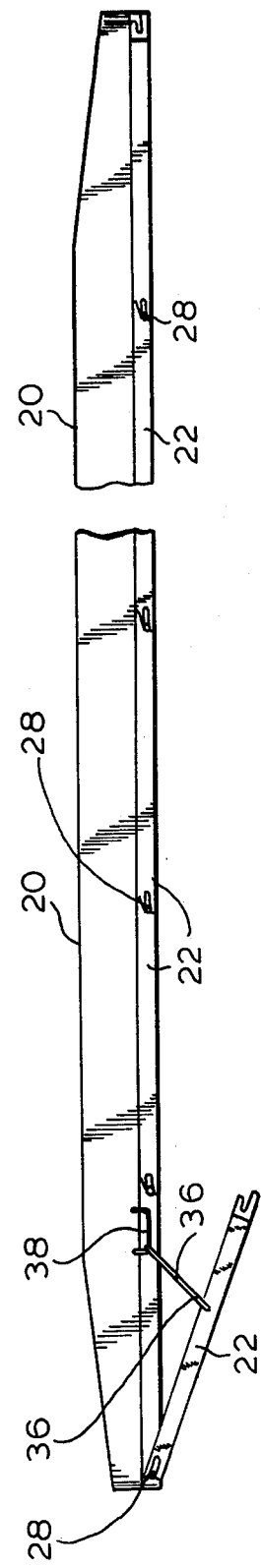

PRESSING PLATE FOR USE IN CHEESE MAKING

The present invention relates to improvements in cheese-making vats and, more particularly, to pressing plates used to drain the whey from the curds in the production of cheese.

Rectangular vats are used in cheese making and the bottoms of such vats are covered by a metallic or plastic filtering layer. A pressing plate of a slightly smaller cross sectional dimension than that of the vat is placed over the curds in the molding vat to press down upon the curds and thus to drain the curds of remaining whey. In known apparatus of this general type, a filtering sheet is placed between the curds and the pressing plate to permit evacuation of a portion of the whey and to facilitate its extraction. This sheet must be emplaced by operators before the pressing plate is lowered into the vat, must then be lifted out of the vat after the pressing operation has been completed, and must be cleaned for the next operation. Furthermore, it is usual to place washing nozzles under the pressing plate for washing the vat, and this is also done manually before each operation, the washing nozzles then being removed manually.

It is the primary object of this invention to eliminate these inconveniences and to provide a pressing plate which considerably reduces manual handling and facilitates the operation as well as the maintenance of the vat.

This and other objects are accomplished according to the invention with a pressing plate constituted by a case having an inner surface and a series of rigid filter panels disposed to cover substantially the entire inner surface. Each filter panel is constituted by a filtering surface and a plurality of ribs supported on the inner surface of the case. The filtering surface and the inner case surface define therebetween a space enabling the whey to flow therethrough towards an end of the pressing plate upon application of the pressing plate to the curds, and the ribs define ports enabling the whey to flow through the space.

This pressing plate construction makes it possible to do away with the manual handling operations in known cheese-making vats described hereinabove. In addition, the panels may be made of stainless steel and have a much longer operating life than the filtering sheets of the prior art. Furthermore, since the filtering surface of the panels is spaced from the inner surface of the case, the buoyancy force according to the principle of Archimedes is eliminated because the height of the whey does not exceed the thickness of the panel and, therefore, the pressing force is applied completely to the curds.

The above and other objects, advantages and features of the present invention will become more apparent from the following detailed description of certain now preferred embodiments thereof, taken in conjunction with the accompanying, generally schematic drawing wherein FIG. 1 is a side elevational view of a cheese molding vat incorporating the pressing plate of this invention;

FIG. 2 is an enlarged side elevational view of the pressing plate of FIG. 1;

Figure 3:
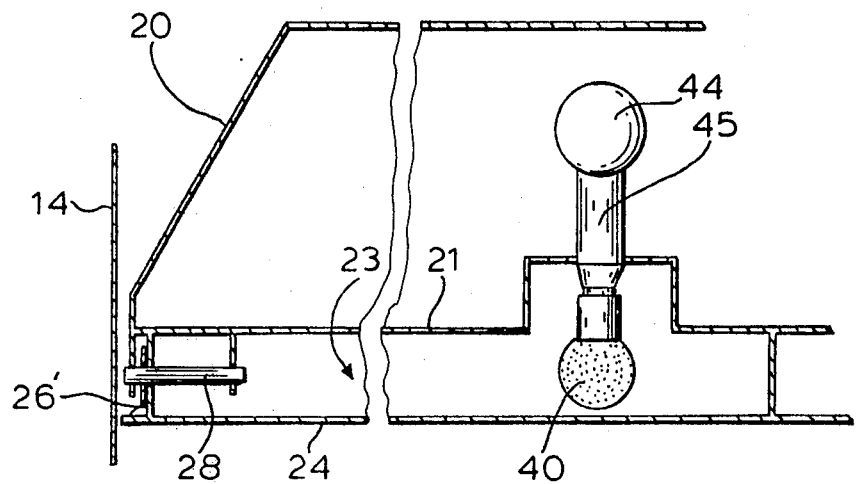
FIG. 3 is a partial transverse section of the pressing plate of FIG. 2, on an enlarged scale.

Referring now to the drawing and first to FIG. 1, there is shown vat 10 of rectangular cross section and having a length substantially exceeding its width. The vat is supported on a frame equipped with feet resting on the floor. The vat has a bottom 12, two longitudinally extending walls 14 and two end walls, one end wall 16 being fixed to the bottom while the opposite end wall 18 is movable and constitutes a door which may be opened, for instance by lifting it by means of a jack, to enable the cake of curds to be removed from the vat at the opposite end thereof. The bottom of the vat is covered by a filtering sheet and has channels leading to a collecting vessel for receiving the liquid filtered through the sheet. The filtering sheet may be displaced along the vat bottom, after wall door 18 has been opened, to remove the curds from the vat.

Plate 19, whose dimensions are slightly smaller than the cross section of molding vat 10, is used for pressing the curds in the molding vat after most of the whey has been drained therefrom in a preceding vat in a manner described, for example, in U.S. Pat. No. 2,193,462, dated Mar. 12, 1940. Suitable means for vertically displacing pressing plate 19 and thus to apply pressure to the underlying curds in vat 10 is mounted on vertical pillars 21. As more fully shown in FIG. 2, pressing plate 19 is constituted by case 20 having an inner surface and a series of rigid filter panels 22 disposed to cover substantially the entire inner surface of the case. FIG. 3 shows pressing plate case 20 to have a lateral edge slightly spaced from longitudinally extending side wall 14 of the vat, i.e. to be of a dimension somewhat smaller than that of the vat for ready movement thereinto and out of the vat while filtering panel 22, which is shown to comprise a filtering surface constituted by perforated stainless steel sheet 24 in FIG. 3, has a width exceeding that of case 20. This enables the space between the lateral edge of the case and the vat walls to be somewhat larger than in conventional cheese making apparatus of this kind, thus avoiding deformations of the vat by the vertical movement of the pressing plate in relation thereto.

Figure 4:
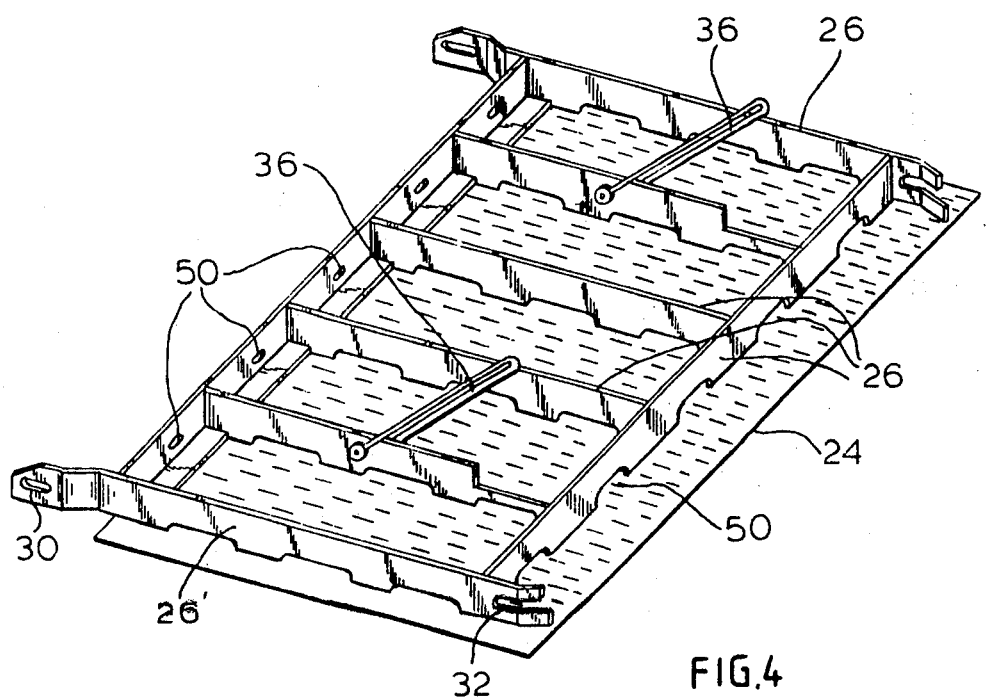
FIG. 4 shows a perspective view of a filter panel of the pressing plate.

The filter panel is best shown in FIG. 4 and is constituted by slotted filtering surface 24 and a plurality of ribs 26 supported on inner surface 21 (see FIG. 3) of pressing plate case 20. The ribs extend in a transverse and longitudinal direction to reinforce the filtering surface and include two end ribs 26'. Filtering surface 24 and inner case surface 21 define therebetween space 23 (see FIG. 3) enabling whey pressed out of the curds to flow therethrough towards an end of the pressing plate upon application of the pressing plate to the curds, and the ribs define ports 50 enabling the whey to flow through the space.

Figure 6:
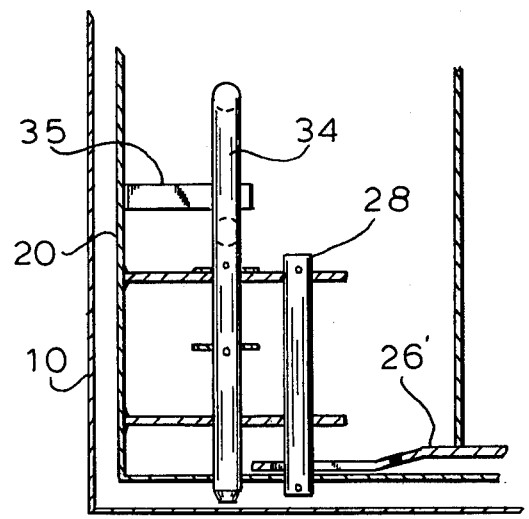
FIG. 6 is a horizontal section showing the same end of the pressing plate and illustrating the bolting system for the filter panels.

In the preferred embodiment illustrated herein, horizontal axles 28 are disposed along one of the edges of the panels for pivotally mounting panels 22 whereby the panels may be pivoted into an operating position on case 20, and hooking systems maintain the panels in the operating position parallel to the inner surface of case 20. The two end ribs 26' extend perpendicularly to a respective one of axles 28 and define elongated slots 30 at one end thereof, which is designated the rear end. Horizontal axles 28 are received in slots 30 to permit the panel to be displaced in the plane thereof in a direction perpendicular to the axles. The hooking systems are constituted by axles affixed to panels 22 and extending parallel to the pivoting axles. Notches 32 in the opposite ends of the two end ribs 26' extend parallel to slots 30 and are arranged for engagement with, and disengagement from, the axles affixed to the panels upon displacement of the panels in their planes. Disengagement of the notches from the axles permits the panels to be pivoted from their operating position into an open position (see left-most panel 22 in FIG. 2). As shown in FIG. 2, panels 22 are arranged edge-to-edge and pivoting axles 28 of each panel 22, except a first panel at an end of case 20 adjacent rear end wall 16 of vat 10, constitute the axles of the hooking system of the preceding panel. The panels are so arranged that each panel in the operating position thereof prevents the succeeding panel from being pivoted into the open position. Axles 28 are so spaced from each other and in relation to notches 32 that the notches will be disengaged from the axles by displacing panels 22 rearwardly in their planes, i.e. towards end wall 16 of the vat. Normally, this rearward displacement of the panels is prevented by two bolts 34 (FIG. 6) arranged behind end ribs 26' of the first panel, which is close to rear end wall 16 of vat 10. When these bolts are in place, none of the panels 22 can be displaced rearwardly because filtering surfaces 24 adjoin each other and the end of end ribs 26' of one panel serves as an abutment for the rear transverse rib of the next panel. The bolts of this locking system are equipped with a handle and a lug which is engaged behind catch 35 welded to the vat to prevent an untimely opening of the panels. After disengaging bolts 34, the first panel may be retracted to disengage its end from axles 28 pivotally supporting it. Thus, the panel may be pivoted into the open position shown on the left in FIG. 2 about the axles supporting the rear end of the panel. Subsequently, all the other panels may be successively displaced rearwardly and may be pivoted into the open position away from the inner surface of case 20.

As shown in FIGS. 2 and 4, means is provided for limiting the pivoting movement of panels 22, the illustrated limiting means including tie rods 36 having the shape of safety pins linked to respective ribs 26 at one end thereof while their opposite ends glide along horizontal bars 38 affixed to inner surface 21 of case 20. Other means for limiting the pivotal movement of the panels may be used, of course, such as cables, chains, telescoping devices and equivalent means.

To place the panels in their operating position, the procedure is reversed and the panel next to front end wall 18 is pivoted back into the operating position, followed by the succeeding panels until the first panel is locked in position by emplacing bolts 34.

As shown in FIGS. 3 and 4, the illustrated pressing plate also comprises washing nozzles 40 disposed between filtering surface 24 of panels 22 and case 20. These nozzles are arranged between the reinforcing ribs of the panels and enable the vat and the panels to be washed after the panels have been pivoted into the open position. Since the washing nozzles are disposed between the case and the filtering surface, they are protected and it is not necessary to remove them before each pressing operation and mount them again. Spray nozzles 40 are mounted on feed conduits 45 which receive a washing fluid from main 44. Feed main 44 and conduits 45 are mounted in case 20 and spray nozzles 40 are arranged to project a spray of washing liquid against the walls and bottom of vat 10 after the cheese curds have been removed therefrom. This washing operation is effectuated while panels 22 are open and serves to wash the panels simultaneously.

Figure 5:
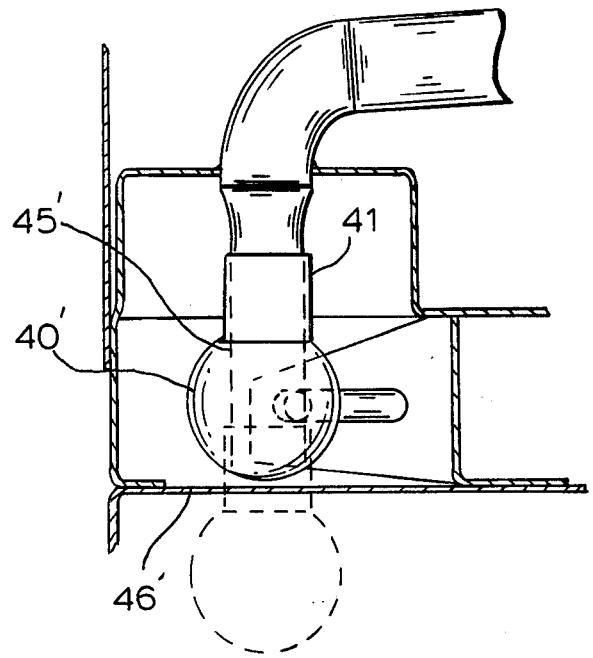
FIG. 5 is a section along the median vertical plane of the pressing plate, showing an end of the pressing plate in alignment with the rear end of the vat.

As shown in FIG. 5, washing nozzles 40' may be telescopingly mounted on vertical feed connections 45' for displacing the nozzles between an operating position (shown in chain-dotted lines) below the plane defined by the filtering surface of the panels in the operating position thereof and a rest position (shown in full lines) above that plane.

Illustrated spray nozzle 40' is situated at an end of the pressing plate adjacent rear end wall 16 of vat 10 and this pressing plate end is in alignment with movable partition 46 which delimits the volume of vat when the operating volume is at a maximum and behind this partition when the operating volume is reduced and, therefore, it never is in contact with the curds. For this reason, a small zone is left at this end of the pressing plate which is not covered by a filtering surface. Spray nozzle 40' in this zone is equipped with tubular collar 41 glidingly mounted on vertical connection 45', a fluid-tight gasket being interposed between the connection and the gliding collar. Abutments (not shown) delimit the vertical gliding movements of the spray nozzle. When the pressing plate is lifted and spray nozzle 40' is supplied with washing liquid under pressure, it occupies the lower position shown in FIG. 5. When the pressing plate is lowered to press the curds and drain the whey, and when it comes into contact with movable partition 46, the spray nozzle 40' is pushed upwardly, i.e. it is telescoped into the retracted position shown in full lines in FIG. 5.

At the beginning of the pressing operation, a considerable amount of whey passes through filtering surface 24 of panels 22 and flows through space 23 between inner surface 21 of pressing plate case 20 and the filtering surface towards the end of the pressing plate adjacent fixed rear wall 16 of vat 10. This liquid flow is made possible by ports 50 in the reinforcing ribs of panels 22. A portion of the whey also flows between side walls 14 of the vat and the edges of pressing plate case 20.

At the end of the pressing operation, pressing plate 19 is retracted and the pressed curds are then discharged from the vat. During or after this operation, panels 22 are pivoted from their operating position into their open position by two workers, one on each side of the vat, who retract bolts 34 and then displace the panels successively rearwardly to disengage notches 26 from axles 28 and to permit pivoting of the panels into their open position. After the vat has been emptied, the pressing plate is lowered thereinto and washing liquid is supplied to spray nozzles 40 and 40', the spray nozzles being so arranged that their spray jets reach all the walls and the bottom of the vat to permit a thorough washing thereof. At the same time, these jets of washing liquid are received by the panels and they are washed simultaneously.

After washing, the pressing plate is retracted, the panels are pivoted back into their operating position and bolts 34 are reset to lock them in that position. The spray nozzles are protected by the panels and need not be removed.

While the present invention has been described herein in connection with certain now preferred embodiments, it will be understood by those skilled in the art that equivalent structural means may be used without departing from the spirit and scope of this invention as defined in the appended claims.

What is claimed is:

1. A pressing plate for use in a cheese-making vat for draining the whey from the curds, the plate being constituted by a case having an inner surface and a series of rigid filter panels disposed to cover substantially the entire inner surface, each filter panel being constituted by a filtering surface extending substantially parallel to the inner case surface in an operating position and a plurality of ribs extending between the filtering surface and supporting the inner surface of the case, the filtering surface and the inner case surface defining therebetween a space enabling the whey to flow therethrough towards an end of the pressing plate upon application of the filtering surface of the pressing plate to the curds, and the ribs defining ports enabling the whey to flow through the space; and means for selectively maintaining the panels in the operating position and for permitting movement of the panels into an open position remote from the inner case surface.

2. The pressing plate of claim 1, wherein said means comprise horizontal axles disposed along one of the edges of the panels for pivotally mounting the panels whereby the panels may be pivoted between the open and operating positions, and hooking systems for maintaining the panels in the operating position.

3. The pressing plate of claim 2, wherein the ribs of each panel include two end ribs extending perpendicularly to a respective one of the horizontal axles pivotally mounting said panel, the two end ribs defining elongated slots at one end thereof and the horizontal axle being received in the slots to permit the panel to be displaced in the plane thereof in a direction perpendicular to the axle, and the hooking systems are constituted by axles affixed to the panels and extending parallel to the pivoting axles, and notches in the opposite ends of the two end ribs, the notches extending parallel to the slots and being arranged for engagement with, and disengagement from, the axles affixed to the panels upon displacement of the panels in their planes, disengagement of the notches from the axles permitting the panels to be pivoted from their operating position into an open position.

4. The pressing plate of claim 3, wherein the panels are arranged edge-to-edge and the pivoting axle of each panel, except a first panel at an end of the case, constituting the axle of the hooking system of the preceding panel.

5. The pressing plate of claim 4, wherein the panels are so arranged that each panel in the operating position thereof prevents the succeeding panel from being pivoted into the open position, and further comprising a locking system preventing the first panel from being pivoted into the open position.

6. The pressing plate of claim 2, further comprising means for limiting the pivoting movement of the panels.

7. The pressing plate of claim 1, wherein the filtering surfaces of the panels have a width exceeding that of the case.

8. The pressing plate of claim 1, wherein the filtering surfaces are constituted by perforated stainless steel sheets.

9. The pressing plate of claim 1, further comprising washing nozzles disposed between the filtering surface of the panels and the case.

10. The pressing plate of claim 1, further comprising washing nozzles and vertical feed connections telescopingly mounting the washing nozzles for displacing the nozzles between an operating position below the plane defined by the filtering surface of the panels in the operating position thereof and a rest position above said plane.

* * * * *